Aug. 28, 1934. A. C. SIGMON 1,971,431
THERMOSTATIC DRAFT CONTROL
Filed March 1, 1933 2 Sheets-Sheet 1
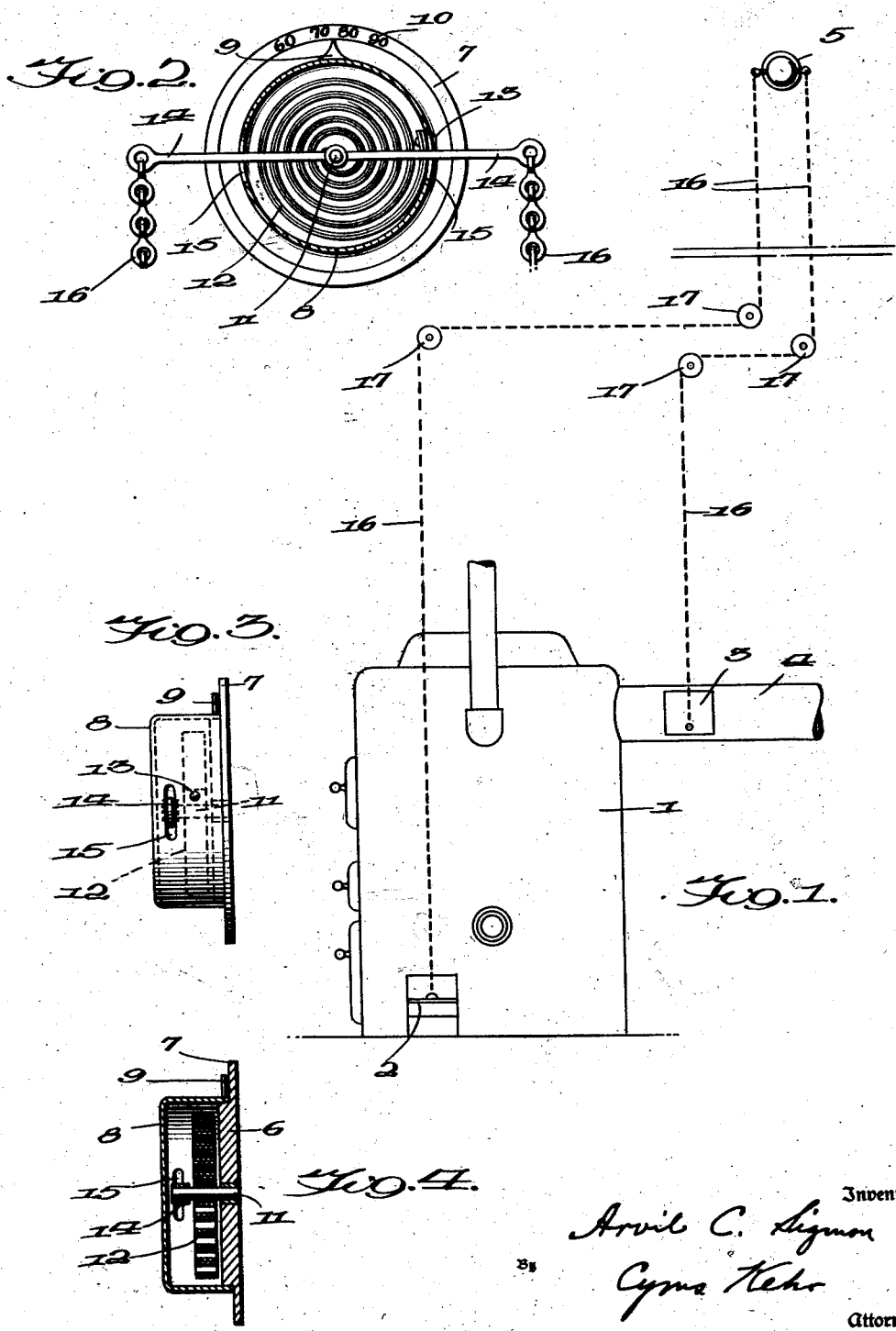
Inventor
Arvil C. Sigmon
By Cyrus Kehr
Attorney Aug. 28, 1934.   A. C. SIGMON   1,971,431
THERMOSTATIC DRAFT CONTROL
Filed March 1, 1933   2 Sheets-Sheet 2

Inventor
Arvil C. Sigmon
By Cyrus Kehr
Attorney

Patented Aug. 28, 1934

1,971,431

UNITED STATES PATENT OFFICE 1,971,431

THERMOSTATIC DRAFT CONTROL

Arvil C. Sigmon, Red Bank, N. J.

Application March 1, 1933, Serial No. 659,181

5 Claims. (Cl. 236—16)

This invention relates to thermostatic draft controls, such as are applied for regulating the checks and drafts of furnaces in order to control the heat of the furnaces.

It is the object of my invention to provide for a mechanical connection between the thermostat and the check or draft dampers in order to vary or adjust the dampers gradually or in accordance with variations in the thermostat, so as to provide for partial opening or closing the dampers as may be desired under certain conditions.

I am aware that heretofore, electrical controls have been provided for regulating the dampers which electrical controls were governed by a thermostat and a switch which was either open or closed, in accordance with a variation in the temperature, but because it was either open or closed, it would provide for either fully opening or fully closing the dampers without partial opening or closing them, such as is provided in my invention. A mechanical connection between the thermostat and the check or draft dampers adjusts the dampers in accordance with slight variations in temperature, thereby providing a partial opening or partial closing of the dampers, and in that way, properly regulating the fire.

In one form of my invention, the thermostat is located in the room to be heated and is connected through flexible means with the draft and check dampers of the furnace and provision is made for adjusting the thermostat to accommodate for variations in temperatures at which it is desired to open or close the dampers.

My invention may be used in connection with the check damper of the furnace which is located in the flue pipe. In such case, the thermostat is attached to the side of the flue pipe and is positively connected with the check damper in the pipe, as for instance, through the shaft carrying said damper and by turning the shaft it changes the position of the damper.

In the accompanying drawings,

Fig. 1 is a diagrammatic view showing the invention applied to regulate the draft and check dampers of the furnace;

Fig. 2 is a sectional view through the thermostat used in connection therewith;

Fig. 3 is a side elevation of the thermostat;

Fig. 4 is a vertical sectional view therethrough;

Figure 5:
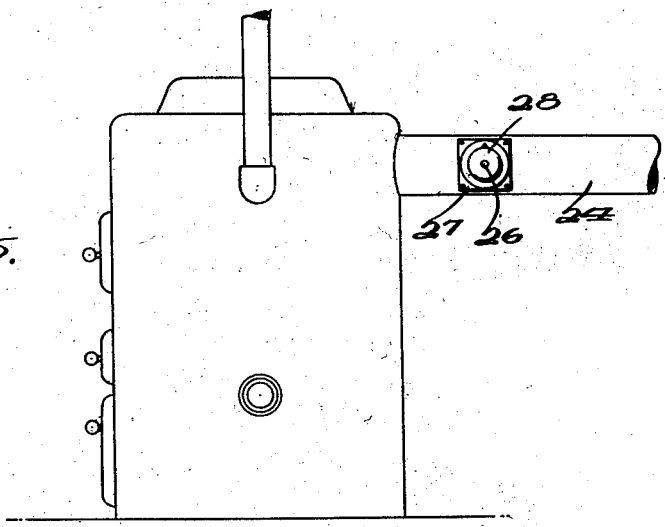
Fig. 5 is a diagrammatic side elevation of a furnace showing the invention applied to the flue damper thereof.

In Fig. 1, the furnace is designated by the numeral 1, and has the usual draft and check dampers 2 and 3, the latter being in a side of the flue pipe 4. These draft and check dampers 2 and 3 are adapted to be alternately opened and closed for providing draft for or checking the fire.

For regulating the dampers 2 and 3, I control them from a thermostat designated generally by the numeral 5, which thermostat is shown in detail in Figs. 2, 3 and 4. A base 6 is provided with a peripheral flange 7, and a cover 8 is applied to the base, so as to be adjustable thereon, and the cover is provided with a pointer 9 adapted to cooperate with graduations 10 on the base which may have indications of variations in temperatures.

A shaft 11 is journaled in the base 6, so as to turn in its bearing and this shaft has secured thereon, one end of a bi-metallic coil 12, the opposite end of which coil is attached to the cover 8 as at 13, which is the fixed end of the coil so that variations in temperature, such as will expand or contract the coil causes the coil to turn the shaft 11.

Also mounted on the shaft 11 is a lever 14 which has its mid-portion fixed to the shaft and extends laterally in opposite direction therefrom. This lever 14 extends through slots 15 in the cover 8, so as to swing about the axis of the shaft 11. The opposite ends of the lever 14 are connected through flexible means, such as chains 16 with the draft and check dampers, respectively, which chains pass over pulleys 17, guiding the same for free movement. By adjusting the cover 8, the tension of the coil 12 may be varied so as to regulate the operation of the thermostat for different temperatures.

The positive mechanical connection between the opposite ends of the lever 14 and the dampers varies the dampers in accordance with variations in the thermostat, so that an increase in temperature for instance will partially close the draft damper and open the check damper in proportion to the increase in temperature.

Figures 6, 7:
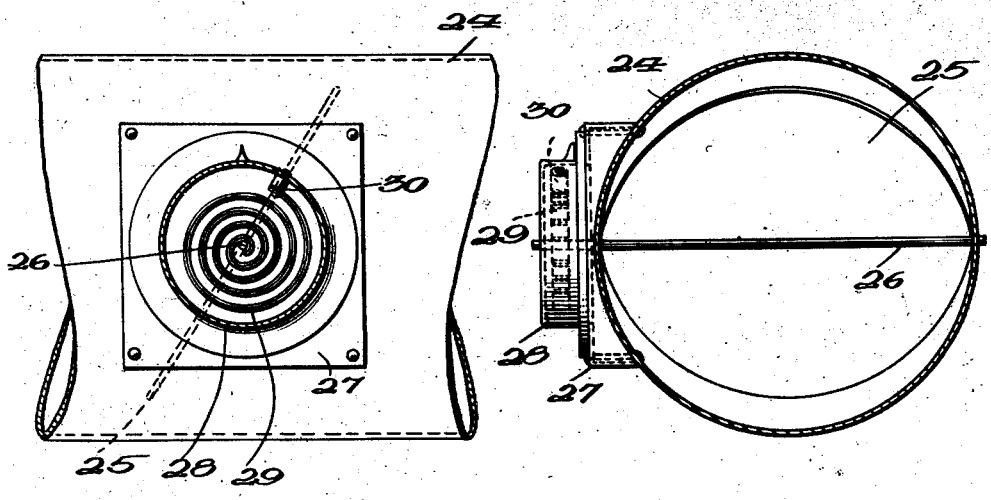
Fig. 6 is an enlarged side elevation partly in section of a portion of the flue pipe and the thermostat applied thereto; and, Fig. 7 is a similar view at right angles thereto.

In the form shown in Figs. 5, 6 and 7, the invention is applied to the damper in the flue designated 24, while the damper is shown at 25 and is carried by a shaft 26, extending crosswise of the flue pipe 24 and is journaled therein. Secured to a side of the flue pipe 24, is a casing 27 on which a cover 28 is adjustably mounted so as to be turned about the axis of the shaft 26. Mounted within the cover 28 is a bi-metallic coil 29, one end of which is fixed to an end of the shaft 26, while the other end of the coil 29 is fixed as at 30 to the cover 28, and which cover is normally held with respect to the casing 27, so as to hold one end of the bi-metallic coil, while permitting the other end to move, due to the expansion or contraction of the coil by variations in temperature, such movement of the last-mentioned end of the coil turns the shaft 26, and thereby the damper 25 to regulate the position of the damper in the pipe 24, in accordance with the temperature at the flue pipe where the thermostatic coil 29 is located and which thereby checks the fire in the furnace automatically according to the temperature at the furnace.

I claim:

1. The combination with a furnace having check and draft dampers, of a thermostatic coil located in a room to be heated by the furnace and remote therefrom, means fixing one end of the coil, a shaft fixed to the free end of the coil and journaled for turning movement in accordance with expansion or contraction of the coil, a lever fixed to said shaft and extending in different directions therefrom, and independent mechanical connections between the opposite ends of the lever and the check and draft dampers to vary said dampers automatically in accordance with the extent of contraction or expansion of the coil.

2. A thermostatic draft control comprising a casing structure, a shaft journaled therein and adapted to be mechanically connected with the damper, a thermostatic coil having one end fixed to the shaft to turn the shaft by expansion or contraction in response to variations in temperature, and a cover for the coil connected with the opposite end of the coil and adustable with respect to the casing structure to vary the operation of the coil.

3. A thermostatic draft control comprising a casing structure, a cover mounted thereon for turning movement, a shaft journaled in the casing structure, a thermostatic coil having one end fixed to the shaft and the other end fixed to the cover, whereby turning of the cover relative to the casing structure varies the tension of the coil and thereby varies the operation thereof.

4. A thermostatic draft control comprising a casing structure, a cover mounted thereon for turning movement, a shaft journaled in the casing structure, a thermostatic coil having one end fixed to the shaft and the other end fixed to the cover, whereby turning of the cover relative to the casing structure varies the tension of the coil and thereby varies the operation thereof, said coil turning the shaft in accordance with variations in temperature, and a lever mounted on the shaft and extending laterally in opposite directions therefrom through the sides of the cover for actuating dampers from the shaft.

5. An automatic damper control comprising a support, a flue damper, a shaft supporting said damper, a thermostatic coil having one end fixed to the shaft for turning the shaft in accordance with variations in temperature, and a cover carried by the support for turning movement relative thereto and enclosing the coil and having one end of the coil fixed thereto, for adjustment of the operation of the coil.

ARVIL C. SIGMON.